United States Patent [19]

Stenlund

[11] Patent Number: 4,878,536
[45] Date of Patent: Nov. 7, 1989

[54] COMBINED FILTER AND HEAT EXCHANGER

[75] Inventor: Stig Stenlund, Saltsjöbaden, Sweden
[73] Assignee: Hypeco AB, Malmo, Sweden
[21] Appl. No.: 224,946
[22] PCT Filed: Feb. 12, 1988
[86] PCT No.: PCT/SE88/00053
§ 371 Date: Jul. 28, 1988
§ 102(e) Date: Jul. 28, 1988
[87] PCT Pub. No.: WO88/06228
PCT Pub. Date: Aug. 25, 1988

[30] Foreign Application Priority Data

Feb. 16, 1987 [SE] Sweden .................... 8700627

[51] Int. Cl.[4] ............... F01M 5/00; F28D 7/10
[52] U.S. Cl. .................... 165/119; 165/51;
165/916; 165/154; 123/41.33; 123/196 AB;
184/6.22; 184/104.3; 210/130; 210/184;
210/186
[58] Field of Search .............. 165/47, 51, 119, 916,
165/154; 210/130, 184, 186; 184/104.3, 6.22;
123/41.33, 196 AB

[56] References Cited

U.S. PATENT DOCUMENTS

| 1,900,821 | 3/1933 | Kline | 210/186 |
| 2,432,475 | 12/1947 | Griffith | 210/184 |
| 2,437,489 | 3/1948 | Vokes | 165/119 |
| 2,713,422 | 7/1955 | James | 165/119 |
| 3,762,467 | 10/1973 | Poon et al. | 210/184 |
| 3,887,467 | 6/1975 | Johnson | 210/186 |
| 4,246,109 | 1/1981 | Manders | 210/130 |
| 4,662,435 | 5/1987 | Bohlin | 165/119 |
| 4,669,533 | 6/1987 | Hehl | 165/119 |

FOREIGN PATENT DOCUMENTS

| 550281 | 4/1932 | Fed. Rep. of Germany . |
| 3101574 | 2/1982 | Fed. Rep. of Germany . |
| 3317008 | 11/1984 | Fed. Rep. of Germany | 210/184 |
| 488598 | 2/1976 | U.S.S.R. | 210/186 |

Primary Examiner—John Ford
Attorney, Agent, or Firm—Browdy and Neimark

[57] ABSTRACT

A combined filter and heat exchanger for simultaneous filtering of a first medium and heat transfer between the first medium and a second medium, for example a combined oil filter and cooler for internal combustion engines includes a filter section comprising a hollow, cylindrical filter element (2) arranged co-axially within an outer casing (1) having a cylindrical wall (1a) which extends around the filter element coaxially therewith and in spaced relationship thereto. A heat-exchanger section is arranged in the space between the cylindrical wall (1a) and the filter element (2). The heat-exchanger section includes a cylindrical partition wall (5) subdividing said space into two chambers. The first medium flows first through the inner chamber and is then distributed across the outer surface of the filter element (2), whereas the second medium flows through the outer chamber (7).

12 Claims, 3 Drawing Sheets

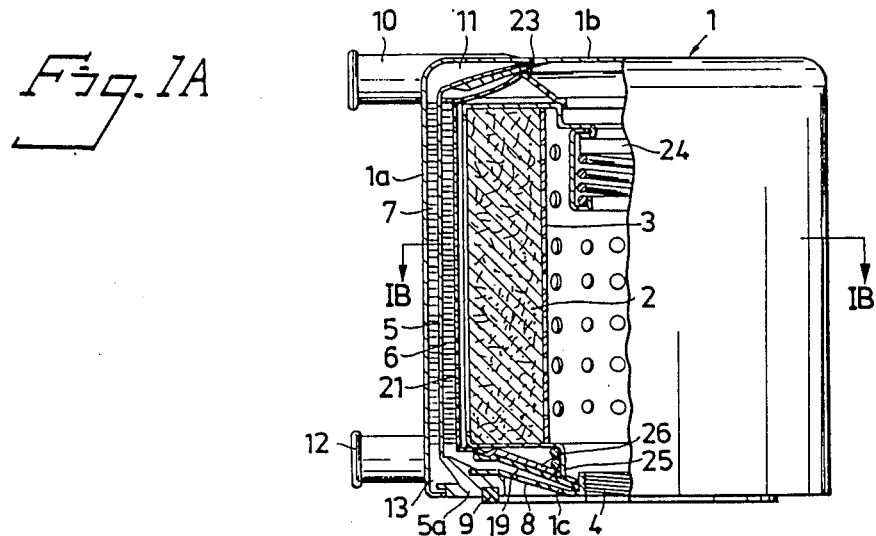
Fig. 1A
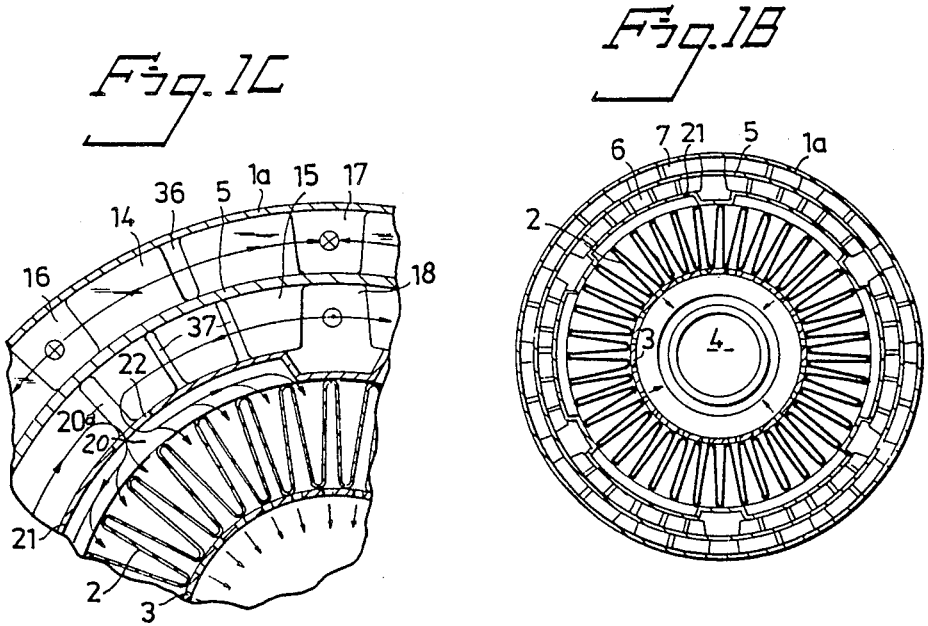
Fig. 1C
Fig. 1B

COMBINED FILTER AND HEAT EXCHANGER

The present invention relates to an arrangement for filtering a first medium while simultaneously effecting an exchange of heat between the first medium and a second medium.

There is, in many cases, a need both to filter a medium and to change the temperature thereof. One obvious example in this regard is the filtration and cooling of lubricants in internal combustion engines, transmission systems, and also the hydraulic fluids of hydraulic systems. Despite the fact that the medium of the filtered and cooled in such cases, and in many other cases, is one and the same, there is used in the majority of cases separate devices for filtering and for cooling the medium, these devices being connected together in series and through passed by the medium is an ordered sequence. One reason for this is because filters can be produced as inexpensive devices for one-time use only and are changed several times during the active life time of the system. On the other hand present day conventional heat exchangers, the function of which is based on a turbulent flow of the two heat transfer media, are many times more expensive than filter components, and are hence designed to remain effective throughout the active life time of the system without requiring to be replaced.

In many cases, however, the heat exchanger is forced to work with media which are contaminated or which give rise to deposits on the heat-exchange contact surfaces. In the case of present day conventional heat exchangers which operate with turbulent flow, these coatings or deposits reduce the heat-transfer efficiency of the heat exchanger to an extent which necessitates cleaning the heat exchanger or replacing the same with a new heat exchanger, at regular intervals. From a maintenance or service aspect, the heat exchanger is normally cleaned or replaced in conjunction with a filer change, and it would be beneficial if the heat exchanger could be produced at such a low price as to enable it to be used as a disposable unit intended for one-time use only. In this case essential advantages would be afforded if the filter and heat exchanger were incorporated in a single, easily exchangeable component.

In the case of automotive vehicle, which in terms of volume dominate the field of both filters and oil coolers, the need to cool the oil used in vehicles has progressively increased in keeping with the increasing power and decreasing volumes of vehicle engines and transmission systems. Despite being mass produced, present day conventional vehicle oil coolers, the function of which is based on turbulent flow of the oil and the cooling medium, which is water or a mixture of water and glycol, are so expensive that they are used only when it is more or less absolutely necessary. The engines and transmissions of modern day vehicles, however, work to a progressively increasing extent at very high temperatures, which without cooling the oil will jeopardize or reduce the useful life and reliability of the system. Consequently, there is a strong desired to use oil coolers in the majority of engines and in many transmission systems, provided that such use can be effected at low total costs and with the aid of compact and reliable constructions which can be built into the engine and transmission system.

The most effective technique at present available with respect to compact heat exchangers is based on turbulent flow and on the use of so-called turbulence generators which engender a thin laminar boundary layer or interface at the contact surfaces of the heat-transfer media and therewith a relatively high transferred effect. A heat exchanger which is constructed in accordance with this hitherto most effective technique, for instance a wateroil cooler for engines or transmissions, will have roughly the same size as an oil filter but, as beforementioned, will be many times more expensive. The combination of a filter and heat exchanger of unchanged construction into one single assembly or unit would result in a relatively large component for which space would be hard to find and which would, furthermore, be much too expensive for use as a disposable component.

In the case of heat exchangers which work with two media, such as oil and water for example, it is extremely important that there is no leakage of one medium to the other. When cooling lubricating oil or hydraulic fluid with the aid of water or a mixture of water and glycol, the systems concerned may be seriously damaged should lubricating oil or hydraulic fluid become mixed with water. There is a significant risk of such leakage taking place in conventional oil coolers based on turbulent flow, because the design of these oil coolers requires a large number of structural elements to be joined together, normally by soldering, at a large number of mutually different locations, therewith producing a long total joint length. This risk of leakage between the media incurred by a technically difficult and demanding jointing method is increased by the vibrations and pressures to which the system is subjected, and also by the thermal stresses and strains induced should the cooling water freeze.

The object of the present invention is to provide a combined filter and heat-exchange device which is effective in filtering one medium while simultaneously effecting an exchange of heat between this medium and another medium and which can be manufactured at a very low price and which has a very small volume and light weight in comparison with conventional arrangments which comprise a filter and a separate heat exchanger of the same heat exchange effect and connected in series with the filter. Another object is to provide a combined filter/heat-exchanger which is highly proofed against leakage between the two media and is highly resistant to vibrations, corrosion, etc. The invention has primarily been developed with the view of providing a small and inexpensive component for simultaneously filtering and cooling lubricant oil or hydraulic fluid, wherewith the coolant consists of either plain water or water mixed with glycol. Although a combined filter and heat exchanger constructed in accordance with the invention can be used in many other fields, the largest single field, and that which probably has the largest potential, lies in the simultaneous filtering and cooling of lubricating oil and hydraulic fluid. The greatest need in this regard is found in the motor vehicle field, although a significant market is also to be found in connection with other systems in which lubricating oil or hydraulic fluid is used.

These objects are achieved with an arrangement that is configured in accordance with the accompanying claims.

The inventive arrangement is primarily characterized in that the heat exchanger is arranged coaxially around the hollow cylindrical filter element between the outer surface of said element and the cylindrical wall surface of the outer casing, and in that the heat exchanger includes a substantially cylindrical partition wall which subdivides said space into a first chamber which lies between the partition wall and the filter element and through which the medium to be filtered flows prior to said medium passing through the filter element, and a second chamber which is located between the partition wall and the cylindrical wall of the casing and through which the other medium flows.

A particularly advantageous embodiment of the inventive arrangement is obtained when the heat-exchanger part of the arrangement is configured in a manner which, in respect of both media, i.e. on both sides of the heat exchanger partition wall, utilizes the novel heat exchange principle which is found described in International Patent Application PCT/SE84/00245 corresponding to allowed U.S. Application No. 847,659 filed 2/25/86, incorporated by reference for the sake of disclosure and which has not yet been applied in practice. This heat exchange principle is based on a laminar flow of the heat exchange media and makes it possible to produce a heat exchanger at very low costs and with a heat-exchange effect per unit of volume which is from three to four times greater than that which can be achieved economically by the best of the present day conventional heat exchangers working with turbulent flow. This extremely good result is achieved while simultaneously providing a heat exchanger which is highly durable to pressure, vibrations, corrosion, etc. Distinct from turbulent flow heat-exchangers, a heat exchanger which is based on the novel technique described in the aforesaid International Patent Application, does not require an increase in the pressure drop in order to increase the heat transfer effect. This embodiment of the inventive arrangement is preferred particularly when both the heat exchange media are difficult from the aspect of heat transfer or when flows of small volume are desired while still placing high demands on the heat exchange effect achieved, for instance when wishing to cool oil with as little water as possible, e.g. in a stationary hydraulic system. It is possible with the aid of this embodiment of the inventive arragement to produce an oil filter and an oil cooler, e.g. for motor vehicles, in the form of a single component, the size of which is insignificantly larger than that of a conventional oil filter designed for the same purpose, and the manufacturing costs of which are only about two to three times the cost of such a conventional filter, despite having the same filter capacity as the conventional filter and an equally as high cooling effect as the separate oil coolers which are required in present day motor vehicles and which in themselves are many times more expensive than present day conventional oil filters and, moreover, require at least as much space as the conventional oil filter alone.

In accordance with one embodiment of the inventive arrangement, the heat-exchange part of the arrangement may be configured in a manner such as to use the heat exchange principle taught by the aforesaid International Patent Application solely for the medium which is also to be filtered, i.e. for the first medium on the inward side of the heat-exchanger partition wall, and to employ for the second medium on the outward side of said portioning wall a heat exchange which is effected with turbulent flow of said second medium. This embodiment can be of interest when wishing to enhance the insensitivity of the arrangement to the presence of contaminants in the second medium, and when the second medium has favourable heat-exchange characteristics and can be used in a relatively high flow volume. One example in this regard resides in the use of the arrangement for filtering and cooling oil in vehicle engines in which the volumetric flow of engine cooling water is high and in which a sufficient quantity of water can be taken from the engine cooling circuit for oil cooling purposes without undue difficulty. This embodiment is thus both practical and economically viable and enables a more contaminated coolant to be used, although it is difficult to prevent the heat exchange effect achieved with this embodiment from being slightly lower than that achieved with the aforedescribed most advantageous embodiment of the invention.

An inventive arrangement is also conceivable in which the heat-exchanger part thereof is constructed for application of a turbulent flow heat-exchange principle with both media, i.e. on both sides of the heat-exchanger portioning wall. Although this embodiment of the invention is more disadvantageous in comparison with the two aforedescribed embodiments, since far greater volumetric flows are required, which results in a much larger and hence more expensive arrangement, the embodiment has good prospects of succeeding in competition with present day conventional techniques in this field.

The invention will now be described with reference to a number of exemplifying embodiments of an inventive arrangement illustrated in the accompanying drawings and intended for filtering and cooling oil, e.g. for internal combustion engines and transmission, by means of water or a water-glycol mixture.

In the drawings:

FIG. 1A is a side view, partly in axial section. of a first preferred embodiment, in which the heat exchange principle according to the International Patent Application PCT/SE84/00245 is applied for both media;

FIG. 1B is a radial sectional view of the arrangement illustrated in FIG. 1A;

FIG. 1C illustrates part of the sectional view of FIG. 1B in larger scale;

Figure 2A:
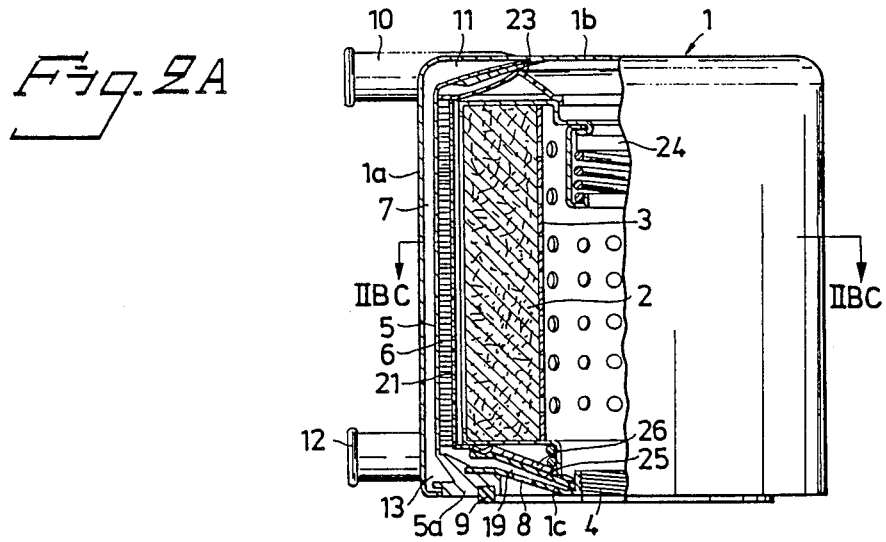
FIG. 2A is a side view, partly in axial section, of a second embodiment in which the heat-exchange principle according to International Patent Application PCT/SE84/00245 is used solely for the medium which is also to be filtered, whereas heat exchange in respect of the second medium is based on turbulent flow.

The inventive arrangement, or combined filter and heat-exchanger assembly, illustrated schematically in FIGS. 1A, 1B and 1C is intended primarily for filtering and cooling oil in, e.g., the engines and transmissions of automotive vehicles, and comprises an outer casing, generally referenced 1, having a cylindrical casing wall 1a and two end walls 1b and 1c connected to respective ends thereof. Extending in the cylindrical casing 1, coaxially therewith, is a hollow cylindrical filter element 2 of conventional design, through which the oil flows in a radial direction inwards, and the inner surface of which is supported by a perforated circular plate 3. As is conventional with such filter elements, one end wall, 1c, thereof has located centrally therein an outlet opening 4 through which oil exits from the chamber configured by the filter element 2. The outer surface of the filter element 2 and the inner surface of the cylindrical wall 1a of the outer casing 1 define therebetween an annular space, which in the case of conventional oil filters is used for the sole purpose of distributing the incoming oil over the outer surfaces of the filter element 2. In the case of the illustrated inventive arrangement, however, this space is utilized to accommodate a heat exchanger for cooling the oil with the aid of a cooling medium, preferably water or a mixture of water with glycol. This heat exchanger includes a cylindrical medium-imprevious partition wall 5 which subdivides the annular space between the mutually opposing surfaces of the outer casing 1 and the filter element into two mutually separate chambers, wherewith the inwardly located chamber 6 defined by the partition wall and the filter element is intended for the throughpassage of oil, whereas the outwardly located chamber 7 defined by the partition wall 5 and the cylindrical wall 1a of the casing 1 is intended for the throughpassage of water, or coolant. The partition wall 5 preferably consists of a single, continuous material piece with no joins therein, so as to minimize the risk of leakage between the two chambers 6 and 7, through the wall 5. The lower, circular end 5a of the wall 5 is joined and secured to the end wall 1c of the casing 1 in a manner such that any leakage which might occur from the chambers 5, 6 at these join locations will be directed outwards to the surroundings and not from one chamber to the other. The upper, circular end of the partition wall 5 may be joined to or secured in the upper end wall of the outer casing in a similar manner. Alternatively, and advantageously, the partition wall 5 may be formed integrally with the upper end wall 1b of the outer casing, in accordance with the illustrated embodiment, wherewith the cylindrical partition wall 5 in the heat exchanger will be part of an element having the configuration of an inverted can. The oil inlet through which oil enters the inwardly located chamber 6 of the heat exchanger is comprised of a number of apertures 8 in the bottom end wall 1c of the casing, this end wall having a slightly conical configuration. An O-ring 9, or like sealing ring, is positioned radially outwards of the oil-inlet apertures 8 and the central outlet opening 4, so as to enable the combined filter and heat-exchanger assembly to be fitted to an engine block, in the standard manner of motor-vehicle oil-filters. Coolant, in this case water, flows into the outer chamber 7 of the heat exchanger, through an inlet pipe 10 which discharges into an annular inlet chamber 11 at the upper end of the assembly, and leaves through an outlet pipe 12, from an annular outlet chambr 13 located at the bottom of the assembly.

In the case of the inventive arrangement illustrated in FIGS. 1a, 1B and 1C, the heat exchanger is configured to work in accordance with the heat-exchange principle described in the aforementioned International Patent Application PCT/SE84/00245, both with regard to oil flowing in the inwardly located heat-exchanger chamber 6 and the water flowing in the outwardly located heat-exchanger chamber 7, this principle being basedon laminar medium flow. The reader is referred to the aforesaid international application for an understanding of the principle construction and method of operation of this type of heat exchanger. In accordance with this heat exchange principle, the partition wall 5 is provided on respective sides thereof with peripherally extending fins 14 and 15 (FIG. 1c), which are formed integrally with the partition wall and which define therebetween intermediate, narrow slot-like, peripherally extending channels, in which the heat-exchange media flow in laminar fashion. The radial height extension of the fins 14 in the chamber 7, through which the water flows, corresponds to the radial distance between the partition wall 5 and the cylindrical wall 1a of the casing 1, whereas the radial height extension of the fins 15 in the inwardly located chamber 6, through which the oil flows, is slightly smaller than the radial distance between the partition wall 5 and the outer surface of the filter element 2. The fins 14 in the outer chamber 7 are broken by a plurality of axially extending distributing channels 16, six in number in the illustrated embodiment, the lower (axial) ends of which are closed while the upper (axial) ends of which communicate with the annular, water inlet chamber 11. The water will thus flow axially downwards through the distributing channels and exit therefrom to flow peripherally with laminar flow through the slot-like flow channels between the fins 14, in the manner indicated by arrows in FIG. 1C. The water exiting from the slot-like flow channels is collected in a corresponding number of axially extending collecting channels 17, i.e six in number in the illustrated embodiment, the upper (axial) ends of which are closed and the lower (axial) ends of which communicate with the annular outlet chamber 13. The peripherally extending fins 14 are broken by a narrow slot 36 between each distributing channel 16 and the nearby collecting channels 17, the purpose of said slots 36 being described in detail in the aforementioned International Patent Application.

The peripherally extending fins 15 in the inwardly located chamber 6 of the heat exchanger are correspondingly broken by a plurality of axially extending distributing channels 18, in the illustrated embodiment six in number, the upper (axial) ends of which are normally sealed and the lower (axial) ends of which communicate with the annular oil-inlet chamber 19 inwardly of the lower end wall 1c of the casing 1, and by axially extending collecting channels 20a located between said distributing channels 18, these collecting channels being normally sealed off at both ends thereof. The fins 15 are broken by means of narrow slots 37 at locations between the distributing channels 18 and the collecting channels 20a, these slots 37 having the same function as the slots 36 in the flanges 14. A substantially cylindrical plate 21 which functions as an oil-flow guiding means is arranged in the annular space between the radially and inwardly facing edges of the fins 15 and the outer surface of the filter element 2. The greater part of the circumference of the plate 21 abuts the radially and inwardly facing edge surfaces of the fins 15, and thus covers the flow channels located between said fins. The portion of the plate 21 located opposite the distributing channels 18, however, is configured so as to abut the outer surface of the filter element 2 instead, whereby the distributing channels 18 obtain a larger throughflow area for the oil flowing therein. The plate 21 is provided with a plurality of apertures 22, e.g. circular holes, at a plate location opposite the axial extending collecting channels 20a. The oil flowing through the oil-inlet apertures 8 and the inlet chamber 19 will thus flow axially upwards in the arrangement, or assembly, through the axially extending distributing channels 18, from which the oil flows in a peripheral direction, and with laminar flow, through the slot-like flow channels located between the fins 15, to the axial extending collecting channels 20a, from which the oil flows out through the apertures 22 in the plate 21 and enters the space 20 located between the plate 21 and the outer surface of the filter element, so that the oil is distributed uniformly over the outer surface of the filter element and can flow through said filter element and exit from the arrangement through the oil outlet 4. A heat exchanger constructed in the illustrated manner affords a very high heat-exchange effect per unit of volume while, at the same time, effectively distributing oil over the outer surface of the filter element 2, so that the filter element is also used effectively. The illustrated heat exchanger is also highly reliable against leakage between the two heat-exchange media and is well able to endure pressure, vibrations, corrosion, etc.

The upper ends of the distributing channels 18 for the inflowing oil are normally closed by an annular spring plate 23, the purpose of which is to hold the filter element 2 in position and to function as a high-pressure valve should the pressure drop across the oil side of the heat exchanger and/or across the filter element 2 exceed a desired value, for example, as a result of blockages or because of a high oil viscosity, e.g. when starting a cold engine. In this case, the outer periphery of the spring plate 23 is lifted so as to open the upper ends of the channels 18, wherewith the incoming oil will flow essentially only through the channels 18 and via the space above the filter element 2 and a further high-pressure valve 24, which opens when the pressure drop across the filter element 2 exceeds a desired value, to the central space located inwardly of the filter element 2, and to the oil outlet 4 without having passed through the filter element. Thus, the oil flowing through the axial channels 18 will not, in this case, contact the outer surface 2 of the filter element, and hence there is no risk of dirt being entrained from the outer surface of the filter element and entering the engine, this risk being highly prominant in the case of conventional oil filters in such circumstances. The relatively wide spacing, and therewith significant volume, which must be provided in conventional oil filter constructions between the filter element and the surrounding outer casing wall can, in accordance with the invention, be utilized for accommodating the heat exchanger and at the same time eliminating the risk of dirt being entrained. The flow paths of the heat exchanger are thus access routes to the filter, which reduces the volumetric requirement of the actual filter itself and also reduces the need for additional space for accommodating the heat exchanger.

Located inwardly of the oil-inlet apertures 8 in the lower end wall 1c of the outer casing is a rubber ring 25 which is pressed downwardly by a spring-biassed plate ring 26 and the purpose of which is to close-off the oil-inlet apertures 8 when dismantling the arrangement, so that oil present in the arrangement will not run out. The rubber-ring 25 thus functions as a check valve, which is lifted and opened by the oil pressure prevailing when the arrangement is fitted in position and in operation.

Figures 2D, 2E:
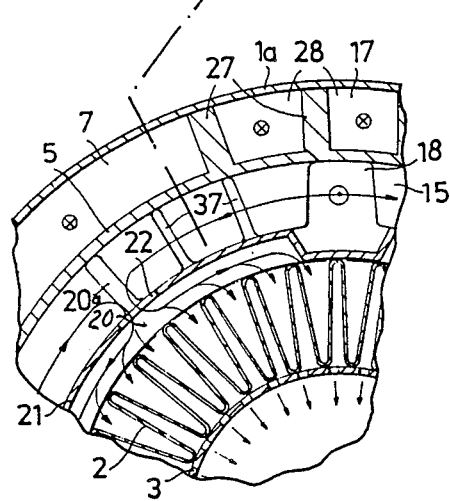
FIGS. 2D and 2E illustrate respectively a part of the sectional views of FIGS. 2B–2C in larger scale.
Figures 2B, 2C:
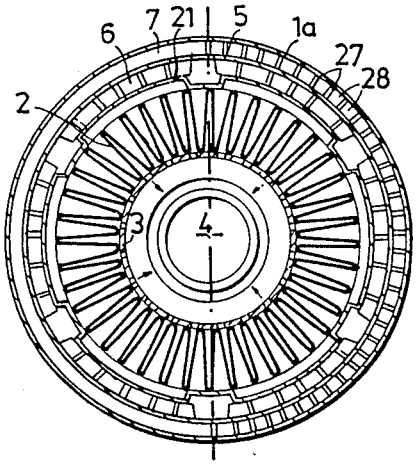
FIGS. 2B and 2C are each radial sectional views of the invention illustrated in FIG. 2A and illustrate respectively two different embodiments of the heat-exchange side on which turbulent flow is employed.

The inventive arrangement illustrated in FIGS. 2A-D is constructed in precisely the same manner as the inventive arrangement illustrated in FIGS. 1A-C with the exception that the outwardly located heat-exchanger chamber 7 located between the partition wall 5 and the cylindrical wall 1a of the outer casing is not constructed in accordance with the heat-exchange principle taught by the aforementioned International Patent Application, but is instead constructed in accordance with the conventional heat-exchange principle employing turbulent flow. Thus, the partition wall 5 may be either completely smooth on the outer surface thereof, as illustrated in FIGS. 2B and 2D, or may be provided with outwardly projecting fins 27, as illustrated in FIGS. 2C and 2E, which fins extend in an axial direction and subdivide the outwardly located chamber 7 into a plurality of axially extending flow channels 28, in which the water entering through the inlet 10 flows axially downwards to the outlet 12 with turbulent flow in a conventional manner.

A combined filter and heat-exchanger arrangement according to FIG. 2 is intended primarily for use in those cases where the medium flowing through the outwardly located chamber 7 has favourable heat-transfer properties, e.g. water, and is available in quantites which will enable large volumetric flow of said medium to be used. The advantage afforded by this embodiment of the inventive arrangement is that in cases such as these the arrangement is less sensitive to contaminants in the medium flowing through the outer chamber 7, since the flow channels in this chamber have a much larger cross-sectional area than the flow channels of the FIG. 1 embodiment. On the other hand, it is difficult with an embodiment constructed in accordance with FIG. 2 to prevent the heat exchange effect being somewhat lower than the heat exchange effect obtained with the FIG. 1 embodiment, without increasing the volume of the FIG. 2 embodiment.

Figure 3A:
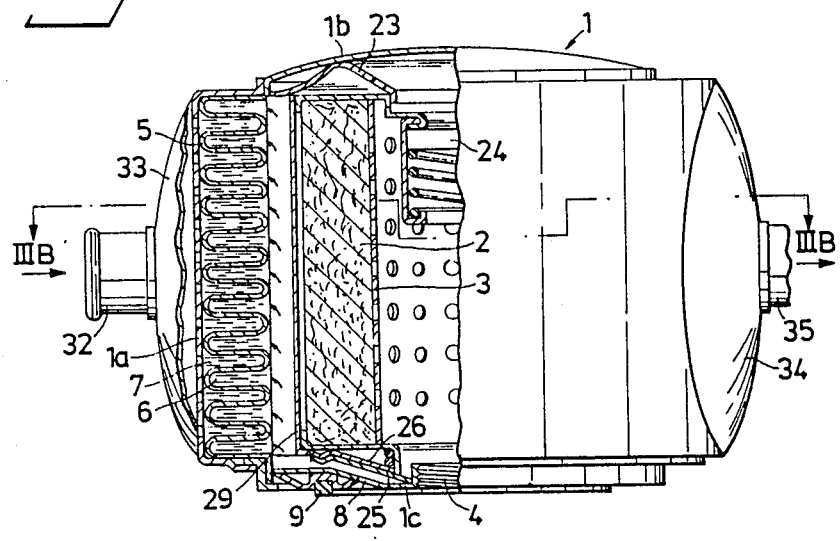
FIG. 3A is a side view, partly in axial section, of a third embodiment in which turbulent flow is applied in respect of both heat transfer media, i.e. on both sides of the heat-exchanger partition wall.
Figure 3B:
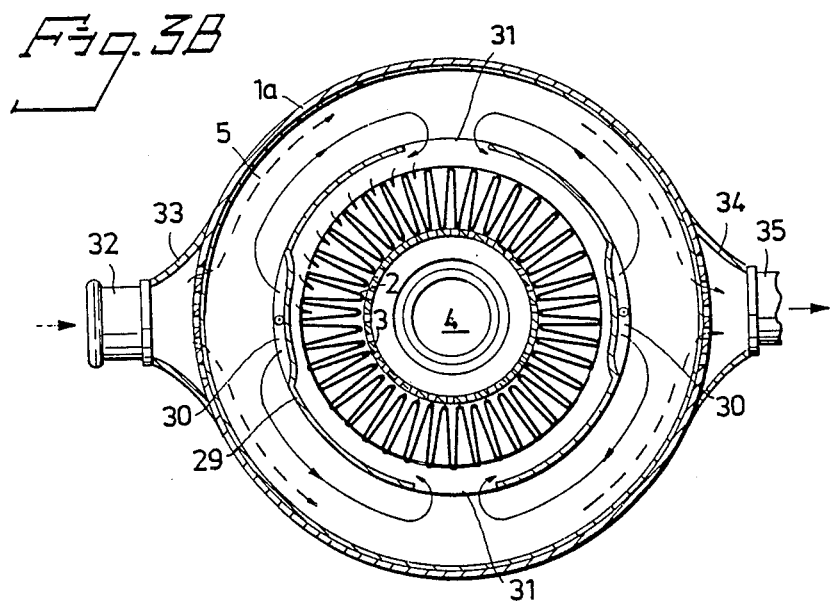
FIG. 3B is a radial sectional view of the arrangement illustrated in FIG. 3A.

FIGS. 3A and 3B illustrate an embodiment of an inventive arrangement which differs from the aforedescribed embodiments in that the conventional heat-exchange principle with turbulent flow is employed on both sides of the heat-exchanger section. In this case, the substantially cylindrical partition wall 5 of the heat exchanger is corrugated with peripherally extending corrugations, so that both the outer chamber 7, throughpassed by water, and the inner chamber 6, throughpassed by oil, are configured by a plurality of peripherally extending flow channels between the corrugations or folds of the partition walls 5, the water and oil flowing through respective channels in turbulent flow. The oil-flow channels on the inwardly located side of the partition wall 5 may incorporate turbulence generators of some suitable conventional kind, for enhancing the turbulence in the oil flow. The corrugated partition wall 5 abuts the cylindrical wall 1a of the outer casing via the radially outward extending apeces of the corrugations, while the radially inward extending corrugation apeces are spaced slightly from the outer surface of the filter element 2. The interspace formed between the partition wall 5 and the filter element 2 accommodates a substantially cylindrical plate 29, similar to the plate 21 in the embodiments according to FIGS. 1 and 2, which is configured so as to form axially extending distributing channels 30, through which the incoming oil flows axially upwards and is distributed between the radially and inwardly open corrugations of the partiton wall 5. The oil then flows in a peripheral direction, in the manner indicated by arrows in FIGS. 3B, to apertures 31 in the plate 9, and passes through said apertures into the space located between the plate 9 and the filter element 2, where the oil disperses over the outer surface of the filter element. The outer casing 1 incorporates a cooling-water inlet tube 32 which discharges into an inlet chamber 33 and which extends throughout the entire axial extension of the arrangement and thus distributes the inflowing water to all radially and outwardly open corrugations in the corrugated partition wall 5. The water flows peripherally in these corrugations to a correspondingly configured outlet chamber 34 and to an outlet pipe 35 connected therewith. As will be understood, the inventive arrangement may be provided with a larger number of curcumferentially distributed water inlets and water outlets, and that the plate 29 may be configured to form more than two distributing channels 30 for the inflowing oil.

Because the heat exchanger of the FIG. 3 embodiment is configured for turbulent flow of both heat-transfer media, a much lower heat-exchange effect per unit of volume is obtained than that obtained with the inventive arrangements illustrated in FIGS. 1 and 2, and hence an arrangement constructed in accordance with FIG. 3 will have a larger volume and a heavier weight than the inventive arrangements illustrated in FIGS. 1 or 2, and will also cost more to produce. Consequently, a combined filter and heat-exchanger arrangement according to FIG. 3 is unable to compete viably with a combined filter and heat-exchange arrangement according to FIG. 1 or FIG. 2, when the arrangement is to be used for simultaneously filtering and cooling oil in, e.g., the engines of motor vehicles, although it is well able to compete with a conventional arrangement comprising a separate oil filter and a separate oil cooler coupled sequentially in series.

A common feature of all the illustrated embodiments of an inventive arrangement is that the heat exchanger is located in a space which is unavoidably required in all instances for supplying the medium to be filtered to the filter element, the heat exchanger assisting to distribute the medium effectively over the outer surface of the filter element. Furthermore, the outer casing which is unavoiably required for housing the filter element in all instances is also used as a part of the heat exchanger, wherewith the inner partition wall in the heat exchanger and the cylindrical wall of the outer casing can effectively co-act with one another to take up those forces engendered by the pressures occurrent in the two media. Consequently, a combined filter and heat-exchanger arrangement according to the invention is characterized by being highly economical with regard to both the consumption of materials in its construction and in the space requried thereby. Furthermore, when the heat-exchanger section of the arrangement according to the embodiments most preferred, i.e. the embodiments according to FIGS. 1 and 2, is constructed to work in accordance with the novel heat-exchange principle taught by the previously mentioned International Patent Application, a very high heat-exchange effect is obtained per unit of volume, which represents additional savings with regard to space, weight and costs.

I claim:

1. An arrangement for simultaneously filtering a first medium and effecting a heat exchange between said first medium and a second medium, comprising a filter section and a heat-exchange section, of which the filter section includes a substantially cylindrical tubular filter element (2) and the heat-exchange section has also a substantially cylindrical tubular form and the filter section and the heat-exchange section are located mutually coaxially within an outer casing (1) having a cylindrical peripheral wall (1a) and end walls (1b, 1c) connected to respective axial ends of said peripheral wall, said outer casing being provied with a first inlet (8) and a first outlet (4) for said first medium and with a second inlet (10) and a second outlet (12) for said second medium, characterized in that the heat-exchange section is located coaxially outwardly of the filter element (2) in an annular space defined between the filter element and the cylindrical casing wall (1a) and includes a substantially cylindrical, liquid-impervious partition wall (5) which subdivides said space into two separate chambers (6, 7), of which the first chamber (6) is located between the partition wall (5) and the filter element (2) and is arranged to be passed through by said first medium, whereas the second chamber (7) is located between the partition wall (5) and the cylindrical casing wall (1a) and communicates with said second inlet (10) and said second outlet (12) for said second medium so as to be passed through by said second medium, said first chamber (6) incorporating a large number of flow channels for said first medium extending in a peripheral direction close to said partition wall (5) and a smaller number of axially extending main flow channels of a first kind (18) and a second kind (20) located alternately at a pripheral distance from one another, said main channels communicating with all said peripherally extending flow channels and being separated from one another by a substantially cylindrical sleeve (21) inserted between the peripherally extending flow channels and the outer surface of the filter element (2) and surrounding the filter element (2), said substantially cylindrical sleeve (21) defining on its radially outwardly facing side said axial main channels of a first kind (18) and separating them from the outer surface of the filter element (2) and defining on its radially inwardly facing side said axial main channels of a second kind (20), which extend along the outer surface of the filter element (2) and communicate with said peripherally extending flow channels through openings (22) provided in said sleeve (21), a flow passage being provided at one axial end of said tubular filter element (2) between a space enclosed by the filter element and said main channels of a first kind (18), said flow passage including pressure relief valve means (23, 24) for opening said flow passage only when the pressure drop across the filter element (2) for said first medium exceeds a predetermined value, and said first inlet (8) and said first outlet (4) being provided in the casing end wall (1c) at the opposite axial end of the filter element (2) and communicating with either of said main channels of a first kind (18) and said space enclosed by the filter element (2).

2. An arrangement according to claim 1, characterized in that said first inlet (8) for said first medium is communicating with said main channels of a first kind (18) and said first outlet (4) for said first medium is communicating with said space enclosed by said filter element (2).

3. An arrangement according to claim 1 or 2, characterized in that the inner surface of the partition wall (5) facing said first chamber (6) has provided thereon a large number of inwardly projecting, peripherally extending fins (15) forming said large numer of flow channels which are formed integrally with the partition wall and which define therebetween peripherally extending, slot-like flow channels, in which said first medium flows in laminar fashion.

4. An arrangement according to claim 3, characterized in that said peripherally extending fins (15) are broken by a number of axially extending distributing channels and collecting channels which are located alternately at peripheral distances from one another and which form at least part of said main channels of a first kind (18) and communicate with sid main channels of a second kind (20).

5. An arrangement according to claim 1, characterized in that the outer surface of the partition wall (5) facing the second chamber (7) is provided with a large number of outwardly projecting, peripherally extending fins (14) which are formed integrally with a partition wall and define therebetween slot-like flow channels, in which the second medium flows in laminar fashion, said fins (14) being broken by a number of axially extending distributing channels (16) and collecting channels (17) which are located alternately at peripheral distances from one another and which communicate at one axial end with said second inlet (10) for the second medium and said second outlet (12) for the second medium, respectively.

6. An arrangement according to claim 1, characterized in that said second chamber (7) is constructed so that the second medium flows therethrough in turbulent fashion.

7. An arrangement according to claim 6, characterized in that the outer surface of the partition wall (5) facing said second chamber (7) is provided with outwardly projecting and axially extending fins (27) which are formed integrally with the partition wall and which subdivide said second chamber in a plurality of axially extending flow channels (28), one axial end of which channels communicates with said second inlet (10) for the second medium and the opposite axial ends of which communicate with said second outlet (12) for the second medium.

8. An arrangement according to claim 1, characterized in that said first and second chambers (6, 7) are constructed for turbulent flow of said first and said second medium flowing therethrough.

9. An arrangement according to claim 8, characterized in that the partition wall (5) is corrugated to present peripherally extending corrugations in a manner such that the radially outwardly directed corrugation apices abut the inner surface of the cylindrical casing wall (1a), while the radially inwardly directed corrugation apices are located at a radial distance from the outer surface of the filter element (2) and abut said substantially cylindrical sleeve (29), the radially outwardly open corrugations defining a plurality of peripherally extending flow channels which form said second chamber (7) and all of which communicate with said second inlet (32) for the second medium at at least one peripheral location and communicate with said second outlet (35) for the second medium at at least one other peripheral location, and the radially inwardly open corrugations of the partition wall (5) forming said peripherally extending flow channels in said first chamber (6).

10. An arrangement accoding to claim 1, characterized in that the partition wall (5) consists of a single material piece devoid of all joints.

11. An arrangement according to claim 1, characterized in that the opposite axial ends of the partition wall (5) are joined to said outer casing (1) exclusively by joints which are located between said first chamber (6) and the external side of the casing (1), whereby any leakage through said joints can take place only to the ambient surroundings.

12. An arrangement according to claim 1 characterized in that the opposite axial ends of the partition wall (5) are joined to said outer casing (1) exclusively by joints which are located between said second chamber (7) and the external side of the casing (1), whereby any leakage through said joints can take place only to the ambient surroundings.

* * * * *